Patented Apr. 24, 1951

2,550,046

UNITED STATES PATENT OFFICE 2,550,046

PHOTOCHEMICAL PRODUCTION OF BENZENE HEXACHLORIDE

Hermanus Lambertus de Waal, Pretoria, Transvaal, Union of South Africa, assignor to Agricura Laboratoria Limited, Johannesburg, Transvaal, Union of South Africa No Drawing. Application March 5, 1947, Serial No. 732,657. In the Union of South Africa December 4, 1946

3 Claims. (Cl. 204—163)

This invention relates to the production of an increased amount of the gamma isomer in the manufacture of benzene hexachloride.

The object of the invention is to carry out the chlorination of benzene in such a manner that the amount of the alpha and other unwanted isomers in the final chlorinated benzene product is or are depreciated and the amount of the gamma or wanted isomer increased.

A further object is to fortify the benzene to be chlorinated with unwanted isomers of benzene hexachloride.

A still further object is to add to the benzene to be chlorinated a small percentage of chloroform.

A further object is to carry out the chlorination of the benzene and the making of the hexachloride under a blue light for example under a filter of cobalt blue glass.

It is well known that in the production of benzene hexachloride the reaction is accelerated by carrying out the treatment under actinic rays obtained from either sunlight or artificial illumination but it has now been found that illumination through a blue filter such as cobalt blue glass will increase the production of the gamma isomer.

In a previously described process the chlorination was carried to a point where the precipitate in the process was not sufficient to prevent easy filtration. The product was filtered, the precipitated benzene hexachloride was removed and the filtrate added to a further supply of benzene and the chlorinating process continued.

It is also known that the benzene hexachloride so produced by such treatment contained a very small fraction of the desired gamma isomer, and numerous processes have been suggested to extract the gamma isomer or increase its percentage in the final product.

According to this invention the chlorination of the benzene proceeds in the well known manner and after the benzene hexachloride which has precipitated has been removed the liquid, which contains in solution the higher fraction of the desired gamma isomer, is treated for recovery of the latter by evaporation.

The precipitate above mentioned containing mainly the alpha and a lower proportion of the beta isomer is now dissolved in a further supply of benzene and chlorinated, preferably under actinic radiation, and the process of filtration and recovery again repeated. It is found that by thus fortifying the second benzene charge with the precipitate from the prior treatment or treatments the amount of the gamma isomer in the final product, obtained for instance by evaporation of the filtrate, is increased.

Further this invention provides for the addition of a small quantity of chloroform to the benzene to be chlorinated. The presence of the chloroform is found to increase the production of the gamma isomer.

The following examples illustrate, but are not to be construed as limiting the scope of the invention.

Example 1

As an example in carrying out the process according to this invention the chlorinated benzene was allowed to stand for twelve hours. The liquid was separated from the precipitate and treated for the extraction of the hexachloride; it contained a higher percentage of the gamma isomer than occurred in the precipitate. The precipitate was placed in a further supply of benzene containing approximately ten percent. of chloroform and this again chlorinated under a light passed through a blue glass filter. The unprecipitated portion of the charge was removed and after evaporation gave a residue containing approximately twenty percent. of the gamma isomer calculated on the total new yield both precipitated and in solution.

Example 2

A quantity of benzene, freed from thiophene and containing seven and one-half percent. of chloroform was chlorinated in direct sunlight until a weight increase of twenty percent. was obtained. It was then left to stand overnight and the liquid was removed from the benzene hexachloride fraction. This crystal fraction consisted mainly of the alpha isomer with a smaller quantity of the beta isomer.

One litre of benzene again freed from thiophene and containing seven and one-half percent. of chloroform was saturated with the crystal fraction above mentioned (about 110 grams of the fraction was required). The saturated liquid was now chlorinated in direct sunlight until its weight had increased by about twenty percent. This treatment took about two hours and the temperature was not allowed to rise above 35° C. After chlorination the liquid was left overnight at room temperature. A precipitate formed and was found to weigh about 150 grams (i. e. 40 grams more than the fraction used for saturation). This precipitate which again consisted mainly of the alpha isomer and a little of the beta isomer, was used for saturating the next supply of benzene. Chlorination was repeated.

The mother liquor decanted from this second precipitate was found to contain solids having twenty-five percent. of the gamma isomer, or over twenty percent. of the gamma isomer in the total weight of the solids less the fraction used for saturation, formed during the above chlorination process.

It will be understood that while it is known that crude benzene hexachloride may be treated with selective solvents or by other means to extract therefrom a benzene hexachloride containing an enhanced proportion of the gamma isomer, this invention provides a method whereby a higher proportion of the gamma isomer is produced during the actual photochlorination of the benzene and thus a higher total yield of gamma isomer than is obtainable by the photochlorination of benzene by methods hitherto used.

What I claim as new and desire to secure by Letters Patent is:

1. In a process for producing benzene hexachloride containing a high proportion of the gamma isomer, by photochlorination of benzene, wherein dissolved gamma isomer and precipitated alpha and beta isomer are formed, the step of introducing into the reaction medium a mixture consisting substantially of the alpha and beta isomer of benzene hexachloride, thereby increasing the concentration of the alpha and beta isomer of benzene hexachloride in the reaction medium above the concentration of the alpha and beta isomer precipitated in said photochlorination of benzene.

2. In a process for producing benzene hexachloride containing a high proportion of the gamma isomer, by incomplete photochlorination of benzene, wherein dissolved gamma isomer and precipitated alpha and beta isomer are formed, the step of introducing into the reaction medium a mixture consisting substantially of the alpha and beta isomer of benzene hexachloride, thereby increasing the concentration of the alpha and beta isomer of benzene hexachloride in the reaction medium above the concentration of the alpha and beta isomer precipitated in said photochlorination of benzene.

3. In a process for producing benzene hexachloride containing a high proportion of the gamma isomer, by photochlorination of benzene, wherein dissolved gamma isomer and precipitated alpha and beta isomer are formed, the step of increasing, by the introduction into the reaction medium of a solid mixture consisting substantially of the alpha and beta isomer of benzene hexachloride, the concentration of the solid alpha and beta isomer in the reaction medium above the concentration of the alpha and beta isomer precipitated in said photochlorination of benzene.

HERMANUS LAMBERTUS DE WAAL.

REFERENCES CITED

The following references are of record in the file of this patent:

UNITED STATES PATENTS

| Number | Name | Date |
|---|---|---|
| 1,379,367 | Sparre et al. | May 24, 1921 |
| 2,067,172 | Carothers | Jan. 12, 1937 |
| 2,218,148 | Hardie | Oct. 15, 1940 |
| 2,438,900 | Cooke et al. | Apr. 6, 1948 |

FOREIGN PATENTS

| Number | Country | Date |
|---|---|---|
| 471,772 | Belgium | Apr. 14, 1947 |
| 504,569 | Great Britain | Apr. 26, 1939 |
| 573,689 | Great Britain | Dec. 3, 1945 |

FOREIGN PATENTS

Slade, Chemistry and Industry, Oct. 13, 1945, pp. 314–319.